(12) United States Patent
Gaschler et al.

(10) Patent No.: US 7,837,829 B2
(45) Date of Patent: Nov. 23, 2010

(54) LOW-BLISTER PAPER COATING SLIPS

(75) Inventors: Wolfgang Gaschler, Ludwigshafen (DE); Marc Schroeder, Heidelberg (DE); Oliver Birkert, Fussgoennheim (DE); Christoph Hamers, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 102 days.

(21) Appl. No.: 12/066,665

(22) PCT Filed: Sep. 14, 2006

(86) PCT No.: PCT/EP2006/066338

§ 371 (c)(1),
(2), (4) Date: Mar. 13, 2008

(87) PCT Pub. No.: WO2007/033929

PCT Pub. Date: Mar. 29, 2007

(65) Prior Publication Data

US 2008/0255301 A1 Oct. 16, 2008

(30) Foreign Application Priority Data

Sep. 22, 2005 (DE) .................. 10 2005 045 445

(51) Int. Cl.
*D21H 19/20* (2006.01)
*D21H 17/04* (2006.01)
*D21H 17/09* (2006.01)
*D21H 17/34* (2006.01)

(52) U.S. Cl. .................. 162/135; 162/136; 162/137; 526/224; 526/89

(58) Field of Classification Search ................. 526/224, 526/89; 162/135, 136, 137
See application file for complete search history.

(56) References Cited

U.S. PATENT DOCUMENTS

| 5,354,800 | A | * | 10/1994 | Suzuki et al. | ............... 524/460 |
| 5,444,118 | A | * | 8/1995 | Tsuruoka et al. | ............ 524/828 |
| 7,060,762 | B2 | | 6/2006 | Schaedler et al. | |
| 7,196,146 | B2 | | 3/2007 | Manders et al. | |
| 7,282,545 | B2 | | 10/2007 | Gaschler et al. | |
| 7,282,547 | B2 | | 10/2007 | Manders et al. | |
| 7,375,148 | B2 | * | 5/2008 | Gaschler et al. | ............. 523/201 |
| 2004/0242766 | A1 | | 12/2004 | Gaschler et al. | |

FOREIGN PATENT DOCUMENTS

| DE | 42 36 316 A1 | 5/1993 |
| DE | 100 46 930 A1 | 4/2002 |
| DE | 101 48 494 A1 | 4/2003 |
| DE | 101 48 496 A1 | 4/2003 |
| DE | 101 48 497 A1 | 4/2003 |
| DE | 101 48 511 A1 | 4/2003 |
| EP | 0 407 059 A2 | 1/1991 |
| EP | 0 496 925 A1 | 8/1992 |
| WO | WO 03029316 A1 * | 4/2003 |

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

An aqueous dispersion of a polymer, obtainable by emulsion polymerization of compounds (monomers) having unsaturated radicals in the presence of at least two different polymerization regulators A) and B), wherein A) is a compound selected from α-methylstyrene dimer and hydrocarbons which form a pentadienyl or 1-phenylallyl radical on abstraction of a hydrogen atom and B) is a compound having a mercapto group, the amount of B) being more than 2 parts by weight per 100 parts by weight of monomers.

5 Claims, No Drawings

LOW-BLISTER PAPER COATING SLIPS

The invention relates to an aqueous dispersion of a polymer, obtainable by emulsion polymerization of compounds (monomers) having unsaturated radicals in the presence of at least two different polymerization regulators A) and B), wherein A) is a compound selected from α-methylstyrene dimer and hydrocarbons which form a pentadienyl or 1-phenylallyl radical on abstraction of a hydrogen atom and B) is a compound having a mercapto group, the amount of B) being more than 2 parts by weight per 100 parts by weight of monomers.

Papers and cardboard are frequently provided with a pigment-containing coating for improving their printability and their optical properties, such as gloss, whiteness and opacity. The coating materials used here, which are also referred to as paper coating slips, also comprise, in addition to the pigment, a binder which serves for anchoring the individual pigment particles to one another and to the paper surface and thus forming a cohesive pigment layer.

In particular, graphic arts papers and cardboards which are to be printed are coated. Special papers, such as labels, wallpapers and nonprinted silicone papers, which are used as substrates for self-adhesive labels, are also coated.

Although the binder in the paper coating slips is present as a rule only in amounts of up to 30 parts by weight per 100 parts by weight of pigment it does in fact decisively influence the properties of the paper, in particular the print performance and the appearance. For example, the smoothness, the freedom from blisters, the compressibility and the absorption behavior with respect to liquids, for example printing inks or fountain solution, are important for the print performance.

Blisters are understood as meaning the bubble-like delamination of the coat during the drying of the printing inks. Freedom from blisters, which is required in particular for rotary offset papers, is defined as the ability to dry the paper or the printing ink of a freshly printed paper at high temperatures without bubbles being formed.

Another important criterion is the stability of the coating to mechanical stresses. Particularly in the case of offset printing, high mechanical stability must be ensured since the surface is subjected to very great mechanical stress owing to the tack of the printing inks used. Because of the fountain solution used in offset printing, this mechanical strength must also be ensured in the moist state. The mechanical load capacity of a paper coating is also defined as pick resistance, and the mechanical load capacity in the moist state also as wet pick resistance.

The pick resistance of the paper coatings is becoming increasingly important since the greatly increased printing speeds in recent years result in an increasing mechanical load on the paper surface. Because of this, the aqueous polymer dispersions used as binders in the prior art are being used in increasing proportions by weight in the coating. However, the consequence of this is an undesired cost increase of the materials used for the paper coating. Moreover, the increased proportion of binder changes the optical properties and the printability of the paper in a disadvantageous manner. Thus, the increased proportion of binder leads to slower absorption of the printing ink, which in certain circumstances may lead to offset of the printing ink in the stack.

Paper coating slips which comprise styrene/butadiene copolymers as binders are disclosed, for example, in DE-A-10046930, DE-A-10148497, DE-A-10148494, DE-A-10148496, DE-A-10148511 and EP-A-496925. Particularly in the above EP-A-496925 and DE-A-10046930 mixtures of terpinolene and regulators comprising mercapto groups are used in the preparation of the copolymer by emulsion polymerization. The amount of the regulator comprising mercapto groups is not more than 2 parts by weight per 100 parts by weight of polymer.

In these paper coating slips, the freedom from blisters is not sufficient. Although the papers exhibit a very high binding power, the freedom from blisters is insufficient.

It is therefore the object of the present invention to provide paper coating slips having high binding power in combination with a high degree of freedom from blisters. The papers coated with the paper coating slips should be readily printable in the offset process and in particular suitable even for high-speed printing presses.

Accordingly, the polymer dispersion defined at the outset and its use in paper coating slips were found.

The aqueous dispersion of the polymer is obtainable by emulsion polymerization and is preferably prepared by emulsion polymerization.

The following data relating to the amount of the monomers are based both on the amounts used in the polymerization and accordingly on the content of the monomers in the polymer (in polymerized form).

At least 40% by weight, preferably at least 60% by weight, particularly preferably at least 80% by weight, of the monomers are the following main monomers, i.e. main monomers are accordingly used in these amounts in the emulsion polymerization. The emulsion polymer obtained then comprises the main monomers in the corresponding amount.

The main monomers are selected from $C_1$-$C_{20}$-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

Alkyl (meth)acrylates having a $C_1$-$C_{10}$-alkyl radical, such as methyl methacrylate, methyl acrylate, n-butyl acrylate, ethyl acrylate and 2-ethylhexyl acrylate, may be mentioned by way of example.

In particular, mixtures of the alkyl (meth)acrylates are also suitable.

Vinyl esters of carboxylic acids having 1 to 20 carbon atoms are, for example, vinyl laurate, vinyl stearate, vinyl propionate, vinyl versatate and vinyl acetate.

Suitable vinylaromatic compounds are vinyl toluene, α- and p-methylstyrene, α-butylstyrene, 4-n-butylstyrene, 4-n-decylstyrene and preferably styrene. Examples of nitriles are acrylonitrile and methacrylonitrile ((meth)acrylonitrile for short).

The vinyl halides are ethylenically unsaturated compounds substituted by chlorine, fluorine or bromine, preferably vinyl chloride and vinylidene chloride.

Vinyl methyl ether or vinyl isobutyl ether may be mentioned by way of example as vinyl ethers. Vinyl ethers of alcohols comprising 1 to 4 carbon atoms are preferred.

Ethylene, propylene, butadiene, isoprene and chloroprene may be mentioned as hydrocarbons having 2 to 8 carbon atoms and one or two olefinic double bonds.

Preferred main monomers are $C_1$-$C_{10}$-alkyl (meth)acrylates, vinylaromatics, in particular styrene, hydrocarbons having 2 double bonds, in particular butadiene, ethylenically unsaturated nitriles, in particular (meth)acrylonitrile, and any desired mixtures of these main monomers.

Mixtures of main monomers, which must comprise aliphatic hydrocarbons having 2 double bonds, in particular butadiene, are particularly preferred. The content of such monomers is preferably at least 10, preferably at least 30, particularly preferably at least 40, % by weight, based on the overall sum of all monomers.

Mixtures of aliphatic hydrocarbons having 2 double bonds (in particular butadiene) and vinylaromatics (in particular styrene), mixtures of aliphatic hydrocarbons having 2 double bonds (in particular butadiene) with (meth)acrylonitrile or mixtures of aliphatic hydrocarbons having 2 double bonds (in particular butadiene) with vinylaromatics (styrene) and (meth)acrylonitrile are particularly suitable. In the case of the mixtures, the weight ratio of aliphatic hydrocarbons (in particular butadiene) to the overall sum of vinylaromatics (in particular styrene) and, if appropriate, (meth)acrylonitrile is in particular from 10:90 to 90:10, especially from 20:80 to 80:20.

In addition to the main monomers, the polymer may comprise further monomers, for example monomers having carboxyl, sulfo or phosphonic acid groups. Carboxyl groups are preferred. Acrylic acid, methacrylic acid, itaconic acid, maleic acid or fumaric acid may be mentioned by way of example.

Further monomers are, for example, monomers comprising hydroxyl groups, in particular $C_1$-$C_{10}$-hydroxyalkyl (meth)acrylates, or amides, such as (meth)acrylamide.

In a preferred embodiment, the polymer comprises at least 0.1% by weight, in particular at least 0.3% by weight, of further monomers, in particular monomers having acid groups, particularly preferably acrylic acid or methacrylic acid.

The proportion of the further monomers generally does not exceed 20% by weight, in particular 10% by weight, and is particularly preferably less than 5% by weight.

Preferred polymers are composed of:
from 30 to 100% by weight of butadiene
from 10 to 70% by weight of styrene
from 0 to 30% by weight of (meth)acrylonitrile
from 0 to 20% by weight of further monomers or other main monomers, e.g. alkyl (meth)acrylates The preparation of the polymers is effected in a preferred embodiment by emulsion polymerization, and the polymer is therefore an emulsion polymer.

However, the preparation can also be effected, for example, by solution polymerization and subsequent dispersing in water.

In the emulsion polymerization, ionic and/or nonionic emulsifiers and/or protective colloids or stabilizers are used as surface-active compounds.

The surface-active substance is usually used in amounts of from 0.1 to 10% by weight, based on the monomers to be polymerized.

Water-soluble initiators for the emulsion polymerization are, for example, ammonium and alkali metal salts of peroxodisulfonic acid, e.g. sodium peroxodisulfate, hydrogen peroxide or organic peroxides, e.g. tert-butyl hydroperoxide.

So-called reduction-oxidation (redox) initiator systems are also suitable.

The amount of the initiators is in general from 0.1 to 10% by weight, preferably from 0.5 to 5% by weight, based on the monomers to be polymerized. It is also possible to use a plurality of different initiators in the emulsion polymerization.

The emulsion polymerization is effected as a rule at from 30 to 130, preferably from 50 to 100, ° C. The polymerization medium may consist either only of water or of mixtures of water and liquids miscible therewith, such as methanol. Preferably, only water is used. The emulsion polymerization can be carried out both as a batch process and in the form of a feed process, including the step or gradient procedure. The feed process is preferred, in which a part of the polymerization batch is initially taken, heated to the polymerization temperature and prepolymerized and then the remainder of the polymerization batch is fed to the polymerization zone, usually via a plurality of spatially separate feeds, one or more of which comprise the monomers in pure or in emulsified form, continuously, stepwise or with superposition of a concentration gradient while maintaining the polymerization. In the polymerization, a polymer seed may also be initially taken, for example for better adjustment of the particle size.

The manner in which the initiator is added to the polymerization vessel in the course of the free radical aqueous emulsion polymerization is known to the average person skilled in the art. It may be both completely initially taken in the polymerization vessel and used continuously or stepwise at the rate of its consumption in the course of the free radical aqueous emulsion polymerization. Specifically, this depends on the chemical nature of the initiator system as well as on the polymerization temperature. Preferably, a part is initially taken and the remainder is fed to the polymerization zone at the rate of consumption.

The same also applies to the polymerization regulators A) and B); they may be initially taken in the polymerization vessel or fed in during the polymerization, for example continuously or in individual portions; a combination of these measures is also possible, and a preferred embodiment is that described in DE-A-10046930.

For removing the residual monomers, initiator is usually added also after the end of the actual emulsion polymerization, i.e. after a monomer conversion of at least 95%.

The individual components can be added to the reactor in the feed process from above, at the side or from below through the reactor base.

In the emulsion polymerization aqueous dispersions of polymer, as a rule having solids contents of from 15 to 75% by weight, preferably from 40 to 75% by weight, are obtained.

The polymers obtainable by the process according to the invention have, as a rule, a weight average particle diameter below 1000 nm. The dw value of the particle size is defined in the usual manner as the weight average of the particle size as determined by means of an analytical ultracentrifuge according to the method of W. Scholtan and H. Lange, Kolloid-Z. und Z.-Polymere 250 (1972), pages 782 to 796. The ultracentrifuge measurement gives the integral mass distribution of the particle diameter of a sample. From this, it is possible to derive the percentage by weight of the particles which have a diameter equal to or less than a certain size.

In the present invention, the weight average particle diameter is preferably greater than 50 nm, in particular greater than 100 nm and particularly preferably greater than 150 nm; it is preferably less than 500 nm, particularly preferably less than 300 nm; a preferred range is from 100 to 300 nm and in particular from 100 to 180 nm.

Methods for establishing the polymer particle size of an aqueous polymer dispersion are disclosed in the prior art. For establishing a defined polymer particle size, the emulsion polymerization is preferably carried out by the seed latex process or in the presence of a seed latex prepared in situ. The relevant processes are known and are described in the prior art (cf. EP-B 40419 and "Encyclopedia of Polymer Science and Technology". Vol. 05, John Wiley & Sons, Inc., New York 1966, page 847).

The emulsion polymerization is effected according to the invention in the presence of at least two different polymerization regulators A) and B).

Regulator A) is selected from a group of hydrocarbon compounds comprising:

α-methylstyrene dimer and compounds which form a pentadienyl or 1-phenylallyl radical on abstraction of a hydrogen atom. These are compounds which have either a 1,4-pentadiene structure of the formula A1) with one or two hydrogen atoms on the C3 atom (middle carbon atom in the formula below)

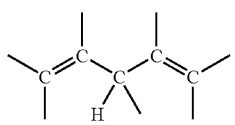
(A1)

or a 1,3-pentadiene structure of the formula A2) with one or two hydrogen atoms on the C5 atom (last carbon atom in the formula below)

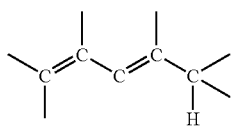
(A2)

it being possible for one of the double bonds also to be part of a phenyl ring. In the structures A1 and A2, the perpendicular lines indicate unsaturated valencies, but without specifying the stereochemistry of the double bonds. The unsaturated valencies may be saturated with hydrogen, an alkyl group or a phenyl group, or two unsaturated valencies in each case may form a 5- or a 6-membered carbocycle. Valencies at two carbon atoms bonded to one another via a double bond, together with the carbon atoms of the double bond, may represent a phenyl ring.

Examples of compounds of the formula A1) are 1,4-dihydrobenzene, γ-terpinene, terpinolene and norbornadiene α-ionone. Examples of compounds of the formula A2) are 1,3-cyclohexadiene, α-terpinene and α-phellandrene.

Preferred compounds A) are compounds of the formula A1). Terpinolene (4-(2-propylidene)-1-methylcyclohex-1-ene) is particularly preferred. Terpinolene has the formula:

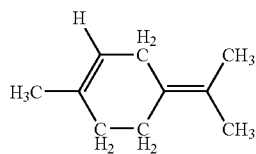

The amount of the regulator A) is preferably from 0.01 to 5 parts by weight per 100 parts by weight of monomers; particularly preferably the amount is at least 0.02 part by weight; very particularly preferably, it is at least 0.05 part by weight; it is particularly preferably not more than 2 parts by weight or not more than 1 part by weight; particularly preferably, the amount is not more than 0.4 part by weight.

In particular, the content of the regulator A) is from 0.02 to 0.7 and, in a particularly preferred embodiment, from 0.1 to 0.4 part by weight.

All parts by weight are based on 100 parts by weight of monomers.

Regulator B) is a compound having a mercapto group (SH group). Apart from the SH group, preferred regulators B) comprise only carbon and hydrogen atoms. $C_4$-$C_{18}$-alkyl mercaptans, such as n-hexyl mercaptan, n-octyl mercaptan, tert-octyl mercaptan, n-decyl mercaptan, n-dodecyl mercaptan, tert-dodecyl mercaptan, n-hexadecyl mercaptan and stearyl mercaptan, may be mentioned as suitable compounds B).

tert-Dodecyl mercaptan is particularly preferred.

The amount of the polymerization regulator B) is greater than 2 parts by weight per 100 parts by weight of monomers; the amount is preferably greater than 2 to 5 parts by weight, particularly preferably from 2.1 to 4 and very particularly preferably from 2.15 to 3 parts by weight per 100 parts by weight of monomers.

The polymer or the aqueous dispersion of the polymer is particularly suitable as a binder in paper coating slips.

Paper coating slips which comprise pigments are particularly suitable.

The paper coating slips comprise in particular white pigments, such as barium sulfate, calcium carbonate, calcium sulfoaluminate, kaolin, talc, titanium dioxide, chalk or coating clay; organic pigments, e.g. luster pigments, may also be present.

The paper coating slips comprise the above polymer, in particular in amounts of from 1 to 50 parts by weight (solid, without water), particularly preferably from 2 to 30 parts by weight and very particularly preferably from 3 to 20 parts by weight per 100 parts by weight of pigment.

In addition to the polymer and pigment the paper coating slip may comprise further constituents.

Optical brighteners, leveling agents, rheology additives, e.g. thickeners, dispersants, emulsifiers and stabilizers may be mentioned by way of example.

The solids content of the paper coating slip is preferably from 30 to 80% by weight, in particular from 40 to 75% by weight, particularly preferably from 50 to 75% by weight.

The paper coating slip can be applied as a coat to paper or cardboard by conventional methods.

A particularly suitable substrate to be coated is base paper or cardboard, precoated papers or cardboard or surface-treated (smoothed, e.g. by calendering) papers or cardboard.

A suitable application method is, for example, the blade method (doctor blade), film press method or curtain coating method.

After the coating, drying is effected in order to remove the water.

The coat weight of the paper coating slip on the substrate to be coated (dry, without water) is preferably from 0.1 to 200 $g/m^2$, particularly preferably from 0.1 to 50 $g/m^2$.

The coatings obtained are very uniform and exhibit no defects or scarcely any defects. High coating speeds are possible.

The coated papers obtained have good performance characteristics, in particular high wet and dry pick resistance, good printability, in particular in the offset process, high rigidity and good gloss, in particular print gloss. In particular, they exhibit little blistering, i.e. bubble formation does not occur during printing, for example in the offset process.

EXAMPLES

The glass transition temperature was determined by means of DSC as the "mid-point" temperature. The relative light transmittance of the dispersion was determined relative to water (100%) on 0.01% strength samples at cell length of 2.5 cm. The determination of the mean particle diameter was effected according to ISO 13321 by quasielastic light scattering using a Malvern Autosizer 2C on about 0.01% strength samples.

The Brookfield viscosity of the paper coating slips was measured by means of a Brookfield RVT viscometer (available from Brookfield Engineering Laboratories, USA) at room temperature of 25° C. For the measurement, 600 ml of the dispersion were introduced into a 1 l beaker and the viscosity was measured with a spindle number no. 4 at a speed of 100 $n^{-1}$.

Preparation of the Dispersion D1 According to the Invention 360 g of water and 27 g of a 33% strength polymer seed ($d_{50}$ 30 nm), 4.5 g of terpinolene and 10% of the initiator solution (feed 2) were initially taken in a polymerization vessel and the mixture was heated to 90° C.

Thereafter, the monomer emulsion (feed 1) and the remaining amount of the initiator solution were added to the polymerization vessel via two separate feeds, beginning at the same time, in the course of 4 h, while maintaining the temperature. After the end of the monomer addition, the reaction mixture was cooled to 85° C. and 8.5 g of tert-butyl hydroperoxide in 90 g of water and a solution of 3.9 g of acetone and 15.7 g of sodium disulfite in 84 g of water were then added in the course of 3 h while maintaining the temperature. 94 g of a 10% strength sodium hydroxide solution were then added. The aqueous polymer dispersion was then cooled to room temperature.

Feed 1:

| | |
|---|---|
| 540 g | of demineralized water |
| 100 g | of emulsifier solution |
| 820 g | of styrene |
| 506 g | of butadiene |
| 104 g | of acrylonitrile |
| 60 g | of acrylic acid |
| 38.7 g | of tert-dodecyl mercaptan |
| 10.7 g | of 25% strength aqueous sodium hydroxide solution |

Feed 2:

| | |
|---|---|
| 10 g | of sodium peroxodisulfate in 230 g of water |

The emulsifier solution consisted of 100 g of a 15% strength solution of dodecylbenzenesulfonate in water.

The solids content of the dispersion was about 51.4%. The light transmittance was 50%. The weight average particle size $d_{50}$ was 165 nm, the pH was 6.2 and the glass transition temperature was 17° C. The proportion of coagulum, which was filtered off over a 45 μm filter and dried, was 3.7 g.

Preparation of the Comparative Dispersion VD1 not According to the Invention

The preparation of this dispersion was effected analogously to the preparation of the polymer dispersion 1, except that only 22.3 g of tert-dodecyl mercaptan were used in feed 1.

The solids content of the dispersion was about 51.5%. The light transmittance was 51%. The weight average particle size $d_{50}$ was 163 nm. The pH was 6.2 and the glass transition temperature was 18° C. The proportion of coagulum, which was filtered off over a 45 μm filter and dried, was 2.8 g.

Production of the Paper Strips:

Both sides of the test strips were produced by coating twice in each case (precoat and top coat) using a laboratory coating machine. The base paper used was wood-free paper having a weight of 80 g/m². For the precoat, 10 g/m² of coating slip were applied in each case per side. For the top coat, 10 g/m² of coating slip were applied in each case per side. After each coating cycle, the paper test strip was dried using an IR lamp. The weight of the finally coated paper test strips was 120 g/m². The papers passed four times through a laboratory calender (one pair of rolls, nip pressure: 2000 N/cm) before the testing of the performance characteristics.

The composition of the paper coating slip for the precoat was as follows:

100 parts by weight of calcium carbonate (Hydrocarb 60 from Omya, Oftringen, Switzerland)

0.2 part by weight of polyacrylic acid (Polysalz S from BASF AG, Ludwigshafen, Germany)

0.85 part by weight of carboxymethylcellulose 2 parts by weight of starch 18 part by weight of the dispersion (50% strength by weight), corresponding to 9 parts by weight of polymer The solids content of the paper coating slip for the precoat was adjusted to 65% with water. The pH of the paper coating slip was 8.5 and was established with 10% strength by weight NaOH.

The Brookfield viscosity of the coating slip SP1 according to the invention, prepared using dispersion D1, was 1220 mPa·s, and that of coating slip VSP1 not according to the invention, prepared from dispersion VD1, was 1240 mPa·s.

The composition of the paper coating slip for the top coat was as follows:

70 parts by weight of calcium carbonate (Hydrocarb 90 from Omya, Oftringen, Switzerland)

30 parts by weight of kaolin (Amazon Premium from Kaolin International)

0.2 part by weight of polyacrylic acid (Polysalz S from BASF AG, Ludwigshafen, Germany)

0.65 part by weight of carboxymethylcellulose 22 parts by weight of the dispersion (50% strength by weight), corresponding to 11 parts by weight of polymer The solids content of the paper coating slip for the top coat was adjusted to 65% with water. The pH of the paper coating slip was 8.5 and was established with 10% strength by weight NaOH.

The Brookfield viscosity of the coating slip ST1 according to the invention, prepared using dispersion D1, was 1490 mPa·s, and that of the coating slip VST1 not according to the invention, prepared from dispersion VD1, was 1480 mPa·s.

Testing of the Tendency of the Papers to Blister

Samples measuring 100×50 mm were cut from the papers coated on both sides.

Before the test, the paper strips were stored at 80% relative humidity for 7 days at room temperature in a conditioned chamber.

A thermostat filled with silicone oil 710 Fluid (Dow Corning) is heated to 180° C. The paper strips are immersed individually for about 2 s in the oil. The occurrence of bubbles was assessed relative to one another according to ratings from 1 (no occurrence of bubbles) to 6 (very pronounced formation of bubbles).

Determination of the Pick Resistance by Means of Prüfbau Offset

The test apparatus comprises a Prüfbau printability tester MZ II, a Prüfbau inking cylinder, metal printing disks 40 mm wide in each case, an application pipette by means of which 0.01 ml can be metered and a further application pipette by means of which 0.001 ml can be metered and long proof sheet supports and a stopwatch.

The printing ink used was Novavit 4F 713 cyan (Kast & Ehinger). Samples having a size of 240 ml by 46 ml in the longitudinal direction are cut from the papers to be tested. The samples are stored separately from one another in a conditioned room for at least 15 hours before the test.

For carrying out the test, the apparatus is switched on, 0.3 ml of the printing ink being fed onto one of the inking cylinders and then a run of 1 minute duration taking place. Thereafter, a printing disk is inserted into a holder provided for this purpose and inking is effected for 30 seconds. For each further printing disk, 0.03 ml of the printing ink is applied to the inking cylinder, followed by a run lasting for 30 seconds, before the inking is effected. The inked inking cylinder can only be used for a certain time span. The nip pressure is set at 800 Newton (=200 Newton/cm), and the printing speed is 1 m/s. The paper strip is clamped on a proof sheet support, and is placed in the tunnel up to the stop before the right printing unit. The inked printing disk is mounted on the right printing unit core, and the printing process is started by pressing the start button. If the coverage point has not been reached with the abovementioned amount of printing ink, the amount of printing ink and its supply must be increased from 0.4 and 0.04 ml to 0.5 and 0.05 ml. The test is continued only when the coverage point was reached in the case of the paper strip. The proof sheet support with the printed paper strip is brought to the starting position. Care should be taken to ensure that the strip is not touched with fingers or other objects. After a specified time span, as a rule 10 s, the printing process is started again without exchanging the printing disk. This is repeated five times altogether.

After each cycle, the pick on the printed side of the paper strip is visually assessed. If no pick occurs after six printing processes, the determination of the tendency to pick is continued at longer time intervals, for example 20 s or 30 s. Before being used the next time, the printing disks used and the inking cylinders are cleaned in each case with heavy naphtha and then dried with a cotton cloth. The result obtained (passes to fail) is expressed as the number of printing processes up to the occurrence of initial pick, the ink application in ml and the time interval between individual cycles in seconds.

The following data were determined for the coated papers:

|  | Paper which was coated with coating slip SP1 and ST1, which each comprised the binder D1 | Paper which was coated with coating slip VSP1 and VST1, each of which comprised the binder VD1 |
| --- | --- | --- |
| Tendency to blister rating | 1 | 6 |
| Prüfbau offset test top/bottom | 5/5 cycles | 5/5 cycles |

We claim:

1. A paper coated with a paper coating slip, wherein the coating slip comprises a polymer produced by the emulsion polymerization of monomers having unsaturated radicals in the presence of at least two different polymerization regulators A) and B), wherein
   A) is terpinolene and
   B) is t-dodecyl mercaptan,
   wherein the amount of B) present during the emulsion polymerization is more than 2.15 parts by weight per 100 parts by weight of the monomers and the amount of A) present during the emulsion polymerization is from 0.02 to 0.7 parts by weight per 100 parts by weight of monomers;
   wherein at least 60% by weight of the monomers are butadiene or a mixture of butadiene and styrene, and
   wherein the paper has no occurrence of blisters after immersion in silicone fluid at 180° C. for two minutes in comparison to a comparative paper slip which is the same except includes a polymer made with less than 2.15 parts by weight of t-dodecyl mercaptan.

2. The aqueous dispersion according to claim 1, wherein at least 40% by weight of the monomers are main monomers selected from $C_1$ to $C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds and mixtures of these monomers.

3. The aqueous dispersion according to claim 1, wherein the weight ratio of butadiene to styrene is from 10:90 to 90:10.

4. The aqueous dispersion according to claim 1, wherein from 0.05 to 5% by weight of the monomers are ethylenically unsaturated carboxylic acids.

5. The aqueous dispersion according to claim 1, wherein the amount of B) present during the emulsion polymerization is more than 2.6 parts by weight per 100 parts by weight of the monomers.

* * * * *